US006070469A

United States Patent [19]
Taniguchi et al.

[11] Patent Number: 6,070,469
[45] Date of Patent: Jun. 6, 2000

[54] PRESSURE SENSOR

[75] Inventors: Naohiro Taniguchi, Hirakata; Shuichi Katayama, Amagasaki; Masami Hori, Hirakata, all of Japan

[73] Assignee: Matsushita Electric Works, Ltd., Osaka, Japan

[21] Appl. No.: 09/149,114

[22] Filed: Sep. 9, 1998

[30] Foreign Application Priority Data

Sep. 30, 1997 [JP] Japan ................................ 9-266548
Dec. 12, 1997 [JP] Japan ................................ 9-343387

[51] Int. Cl.[7] ................................ G01L 9/04; G01L 9/06; G01L 7/08; G01L 9/00
[52] U.S. Cl. ................................ 73/720; 73/721; 73/715; 73/754
[58] Field of Search .................. 73/721, 720, 715, 73/754, 756

[56] References Cited

U.S. PATENT DOCUMENTS

| 3,817,107 | 6/1974 | Shimada et al. . |
| 3,910,223 | 10/1975 | Krohn ................................ 116/70 |
| 4,452,069 | 6/1984 | Hattari et al. ................ 73/35 |
| 4,770,032 | 9/1988 | Plentovich et al. . |
| 4,825,876 | 5/1989 | Beard ................................ 128/675 |
| 5,184,107 | 2/1993 | Maurer ................................ 338/42 |
| 5,193,394 | 3/1993 | Suda . |
| 5,228,334 | 7/1993 | Stone . |
| 5,319,981 | 6/1994 | Mei et al. ................................ 73/706 |
| 5,351,550 | 10/1994 | Maurer ................................ 73/727 |
| 5,483,835 | 1/1996 | Ciolli . |
| 5,621,176 | 4/1997 | Nagano et al. ................ 73/714 |

FOREIGN PATENT DOCUMENTS 2043951 10/1980 United Kingdom .

*Primary Examiner*—Benjamin R. Fuller
*Assistant Examiner*—Abdullahi Aw-Musse
*Attorney, Agent, or Firm*—Greenblum & Bernstein, P.L.C.

[57] ABSTRACT

A pressure sensor includes a body, a pressure inlet tube housed in the body and having a pressure inlet opening defined therein for introducing oil pressure, and a pressure sensor unit affixed to a proximal end surface of the pressure inlet tube covering the pressure inlet opening to convert the oil pressure to an electrical signal. An oil flow decelerating structure is disposed to a distal end side of the pressure inlet tube for reducing the flow rate of oil.

20 Claims, 14 Drawing Sheets

PRESSURE SENSOR

BACKGROUND OF THE INVENTION

1. Field of the Invention

The present invention relates generally to a pressure sensor and, in particular but not exclusively, to a pressure sensor for detecting the pressure of oil for use in controlling, for example, an automobile transmission.

2. Description of the Related Art

FIGS. 1 and 2 depict a conventional pressure sensor for detecting the pressure of a gas or fluid medium, and are exemplary of the various types of pressure sensors that have been proposed. This pressure sensor A houses a sensor unit 2 for converting the pressure of the fluid medium to an electrical signal in a housing 1, and has a pressure inlet tube 3 for introducing the fluid medium to the sensor unit 2. The sensor unit 2 has a sensor chip formed of a semiconductor substrate and including a thin-film diaphragm (not shown) and a detector element (piezoresistor, for example) for detecting pressure-induced distortion of this diaphragm. The housing 1 includes a generally box-shaped body 1a and a cover 1b both made of a synthetic resin. The body 1a has a metal pressure inlet tube 3 in the form of a substantially cylindrical shape insert-molded to project from the bottom thereof. A plurality of pins 4 for supplying an electrical signal from the sensor unit 2 to an external device are implanted in the body 1a, and the ends of these pins 4 are connected to the sensor unit 2 by means of wires 6, which are made of a conductor such as gold or aluminum.

The sensor unit 2 is attached to the end of the pressure inlet tube 3 by means of a glass seat 5, and the pressure of the fluid medium is introduced from an external source through the pressure inlet tube 3 to the diaphragm of the sensor unit 2. The plural pins 4 project in two directions from both sides of the housing 1 to facilitate mounting to a printed circuit board.

One application for the pressure sensor A as described is for oil pressure detection in the control of an automatic transmission of an automobile. In such application, oil pressure is repeatedly applied and then released, and in the course of this a momentarily high pressure surge can occur. The problem is that when the surge pressure exceeds the breakdown strength of the sensor unit 2, the sensor unit 2 can be destroyed.

SUMMARY OF THE INVENTION

The present invention has been developed to overcome the above-described disadvantages.

It is accordingly an objective of the present invention to provide a pressure sensor capable of preventing damage to a sensor unit as a result of a pressure surge in a fluid medium to be detected.

In accomplishing the above and other objectives, the pressure sensor according to the present invention includes a body, a pressure inlet tube housed in the body and having a pressure inlet opening defined therein for introducing oil pressure, a pressure sensor unit affixed to a proximal end surface of the pressure inlet tube covering the pressure inlet opening to convert the oil pressure to an electrical signal, and a decelerating means disposed to a distal end side of the pressure inlet tube for reducing a flow rate of oil.

Advantageously, the decelerating means is formed by a bushing having an offset hole offset from a center axis of the pressure inlet opening, and a communication wall communicating the pressure inlet opening and the offset hole with each other.

A metal filter is preferably received in the pressure inlet opening to reduce the flow rate of the oil.

In another form of the present invention, a pressure sensor includes a body, a pressure inlet tube accommodated in the body and having a pressure inlet opening defined therein for introducing oil pressure, a pressure sensor unit affixed to a proximal end surface of the pressure inlet tube covering the pressure inlet opening to convert the oil pressure to an electrical signal, and an elastic transmission gel for transmitting the oil pressure to the pressure sensor unit. A pressure inlet path is formed in the pressure sensor so as to narrow progressively toward the pressure sensor unit. The pressure sensor unit detects the oil pressure through the transmission gel filled to the pressure inlet path.

Preferably, the transmission gel is a silicone gel containing silicone.

In a further form of the present invention, a pressure sensor includes a case, a sensor unit housed in the case for converting pressure of a fluid medium to an electrical signal, a pressure inlet tube housed in the case for introducing the fluid medium, and an instantaneous high pressure buffering means disposed inside the pressure inlet tube for buffering an instantaneous high pressure applied by the fluid medium to the sensor unit.

Conveniently, the instantaneous high pressure buffering means includes a filter disposed inside the pressure inlet tube. The filter is formed of sintered metallic particles or by knurling a surface of a metal rod. The filter may be a metal rod with a plurality of longitudinal grooves or a screw thread formed on a surface thereof. Alternatively, the filter is formed by rolling and compressing a metal mesh into a rod shape.

Advantageously, the pressure sensor further includes a communication tube having a first end, to which the pressure inlet tube is inserted, and a second end opposite to the first end, and also includes a bushing having an offset hole offset from a center axis of the pressure inlet tube. The bushing is fit to the second end of the communication tube with at least one end thereof held in contact with the filter.

Again advantageously, the pressure sensor further includes a securing member press fit into the pressure inlet tube for preventing removal of the filter. The securing member is of a tubular shape with a bottom in which a hole is provided for passing the fluid medium. The securing member may have a flat body and a plurality of rectangular tabs integrally formed therewith so as project radially outwardly therefrom. Alternatively, the securing member has substantially a C-ring shape and is inserted to and engaged with an engaging groove formed in an inside wall of the pressure inlet tube.

Conveniently, the case has an insertion hole defined therein to which the pressure inlet tube is inserted, and the pressure inlet tube is welded or soldered around substantially an entire circumference of one end thereof to the case at an opening to the insertion hole.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

This application is based on applications Nos. 9-266548 and 9-343387 filed Sep. 30, 1997 and Dec. 12, 1997, respectively, in Japan, the content of which is incorporated hereinto by reference.

Figure 1:
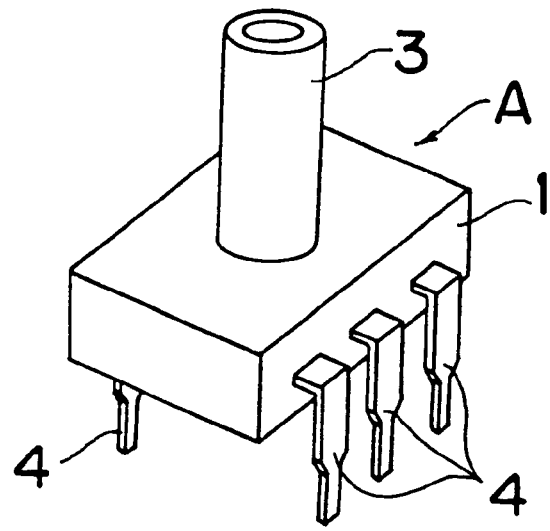
FIG. 1 is a perspective view of a conventional pressure sensor.
Figure 2:
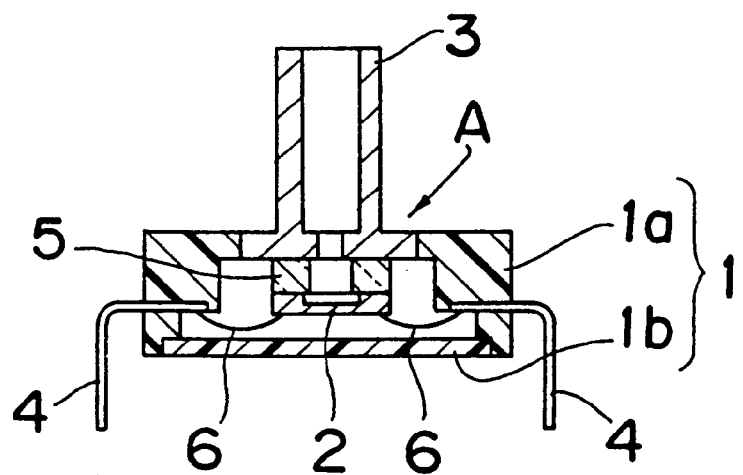
FIG. 2 is a vertical sectional view of the conventional pressure sensor of FIG. 1.
Figure 3:
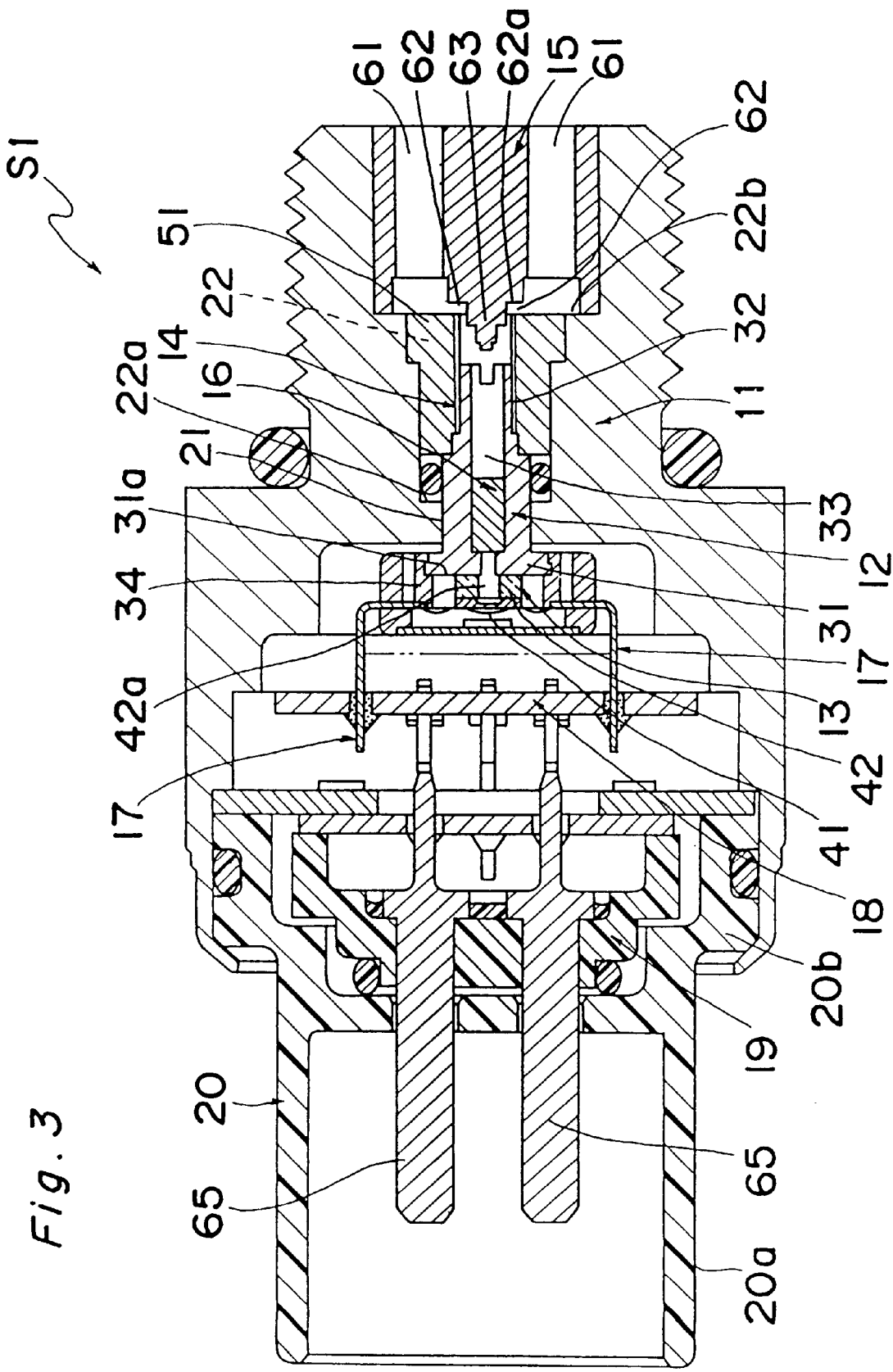
FIG. 3 is a vertical sectional view of a pressure sensor according to a first embodiment of the present invention.
Figure 4:
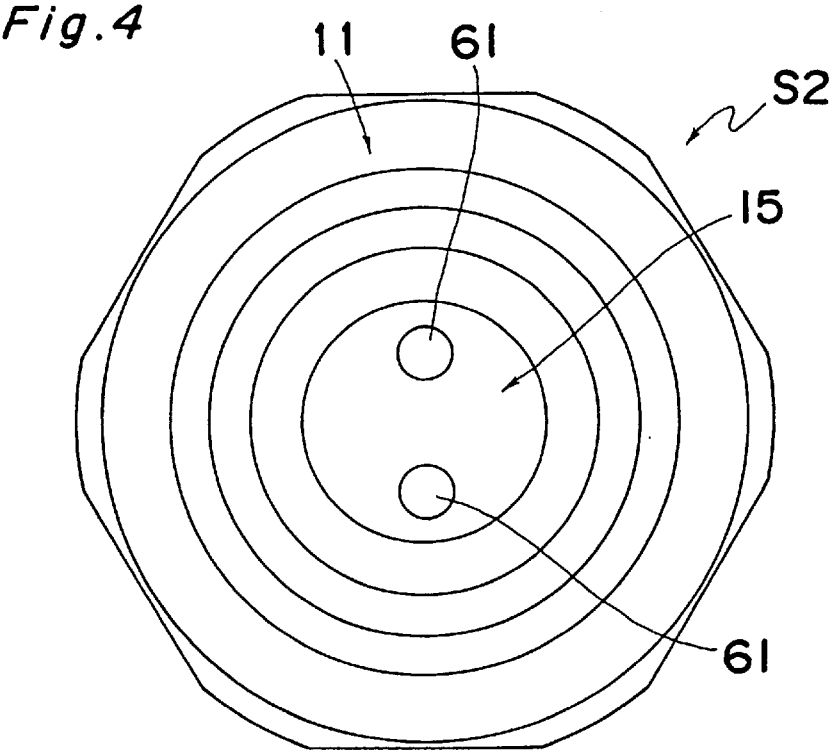
FIG. 4 is a right side view of the pressure sensor of FIG. 3.
Figure 5:
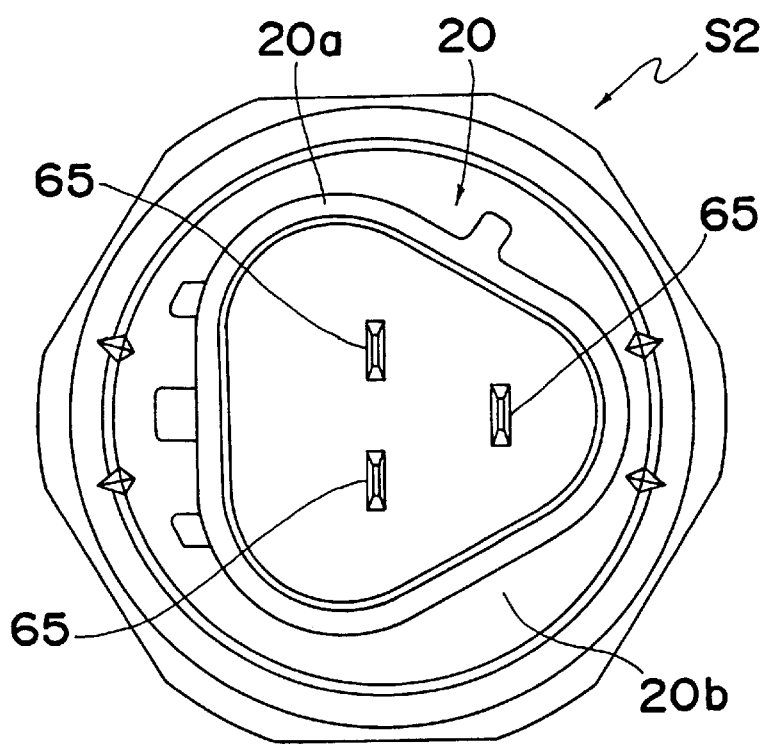
FIG. 5 is a left side view of the pressure sensor of FIG. 3.

FIGS. 3 to 5 depict a pressure sensor S1 according to a first embodiment of the present invention.

A body 11 is made from a metal such as steel or stainless steel into a generally cylindrical form with a bottom 21, and has a hole 22 defined therein concentrically in three stages. The hole 22 is open on both ends with a first shoulder 22a, a second shoulder, and a third shoulder 22b formed in the side walls. The body 11 has one externally threaded end and the other end in the form of a hexagonal nutlike shape.

A pressure inlet tube 12 has a pressure inlet opening 33 with a central axis formed in a substantially cylindrical shape from a metal such as Kovar or FeNi alloy. The pressure inlet tube 12 has a proximal end 31 and an externally threaded distal end 32 opposite to each other. The proximal end 31 has a flange integrally formed therewith so as to project perpendicularly to the central axis. The flange is rigidly secured to a base 34. The pressure inlet tube 12 is inserted into the bottomed hole 22 of the body 11 where the outside circumference part thereof is seated tightly to an O-ring in the first shoulder 22a of the body 11, and the distal end 32 extends to the inside of the bottomed hole 22.

A pressure sensor unit 13 includes a silicon diaphragm 41 and a glass base 42 with an axial hole 42a. The silicon diaphragm 41 has a piezoresistor (not shown) disposed thereto to form a strain gauge and convert pressure to an electrical signal. The silicon diaphragm 41 is tightly affixed to one surface of the glass base 42 so as to cover the axial hole 42a. The other surface of the glass base 42 is tightly affixed with solder to the proximal end surface 31 a of the pressure inlet tube 12 such that the axes of the pressure inlet opening 33 and axial hole 42a are mutually aligned. In other words, the pressure inlet opening 33 is covered by the pressure sensor unit 13.

A pressure inlet path is thus formed by the pressure inlet opening 33 of the pressure inlet tube 12 and the axial hole 42a of the glass base 42. The inside diameter of the axial hole 42a is small relative to the pressure inlet opening 33, that is, the pressure inlet path progressively narrows approaching the pressure sensor unit 13.

A generally cylindrical fixing tube 14 having a generally cylindrical interior and made of a metal such as steel or stainless steel includes a flange 51 on one end thereof and a female thread on the inside circumference wall thereof. The fixing tube 14 is inserted to the bottomed hole 22 of the body 11 with the female thread engaging the male thread of the pressure inlet tube 12, thereby fixing the pressure inlet tube 12 in the body 11 with the pressure inlet opening 33 communicating with the cylindrical interior of the fixing tube 14.

A generally cylindrical bushing 15 is formed of a metal such as steel or stainless steel and has two offset holes 61 defined therein in parallel with each other at positions each offset from the center axis of the pressure inlet opening 33. A notched groove 62 notched toward the center and having a bottom 62a is formed at one end of the side wall forming the offset holes 61, while a projection 63 projecting from the center is disposed at one end of the bushing 15.

The projection 63 is inserted into the bottomed hole 22 of the body 11 so that one end surface of the body bushing 15 is held in contact with the third shoulder 22b of the body 11. By so doing, a communication wall for communicating the pressure inlet opening 33 and the offset holes 61 with each other is formed by the bottom 62a of the notched groove 62 and the flange 51 of the fixing tube 14. The communication wall and the bushing 15 together form a deceleration means disposed to the distal end 32 side of the pressure inlet tube 12.

A metal mesh filter 16 made of metal fibers is disposed within the pressure inlet opening 33 on the proximal end 31 side of the pressure inlet tube 12.

Terminals 17 are fastened to the base 34 with one end thereof electrically connected by wire bonding to an electrode (not shown) provided to the silicon diaphragm 41.

A printed circuit board 18 is fastened to the body 11 by a ceramic substrate on which circuits are formed, and is electrically connected to the pressure sensor unit 13 by being soldered to the terminals 17 passed through the circuit board 18. A terminal block 19 is formed with three simultaneously formed connector terminals 65, which are in turn connected to the terminals 17 by way of the printed circuit board 18.

A connector 20 is formed of a synthetic resin with a generally cylindrical mounting portion 20*a* and a generally cylindrical seat 20*b* having a diameter greater than the outside diameter of the mounting portion 20*a*. The generally cylindrical seat 20*b* is inserted to the body 11 with the connector terminals 65 of the terminal block 19 guided into the inside of the mounting portion 20*a*.

The operation of the pressure sensor S1 thus comprised is described next below. Oil is filled to the offset holes 61 of the bushing 15, the cylindrical interior of the fixing tube 14, the pressure inlet opening 33 of the pressure inlet tube 12, and the axial hole 42*a* of the glass base 42 with air remaining inside each of the filled parts. When a pressure surge or instantaneous high pressure occurs, the oil flows into the offset holes 61 with a specific flow rate maintained as described above, and is slowed by impact with the flange 51 of the fixing tube 14 forming the communication wall.

When the oil then flows into the pressure inlet opening 33 and reaches the metal filter 16 disposed in the pressure inlet opening 33, the metal mesh fibers of the metal filter 16 provide further resistance and the oil is thus slowed further. The oil then passes the axial hole 42*a* of the glass base 42, and impacts the silicon diaphragm 41 of the pressure sensor unit 13. The oil is sufficiently slowed by the bushing 15 and metal filter 16 at this time, and therefore does not impact the silicon diaphragm 41 at high speed.

The pressure to be measured passes the offset holes 61 of the bushing 15, the cylindrical interior of the fixing tube 14, the pressure inlet opening 33 of the pressure inlet tube 12, and the axial hole 42*a* of the glass base 42, and reaches the silicon diaphragm 41. Because the pressure sensor unit 13 is tightly affixed to the proximal end surface 31*a* so that the pressure inlet opening 33 is covered, the oil does not leak to the outside and the pressure loads the pressure sensor unit 13.

When a pressure load is applied to the pressure sensor unit 13, the silicon diaphragm 41 thereof deflects in proportion to the difference between the atmospheric pressure and the pressure of the corrosive fluid. The resistance of the piezoresistor disposed to the silicon diaphragm 41 varies in proportion to the amount of deflection, and is converted to an electrical signal that is applied to the terminals 17, amplified by an amplification element (not shown) disposed to the printed circuit board 18, and applied to the connector terminals 65 to measure the oil pressure.

With the pressure sensor S1 according to the above-described first embodiment of the invention, a decelerating means for reducing the flow rate of the oil is disposed to the distal end 32 side of the pressure inlet tube 12. As a result, the flow rate of oil resulting from a pressure surge is reduced by the decelerating means at the distal end 32 of the pressure inlet tube 12, and the oil does not impact the pressure sensor unit 13 at high speed. The pressure sensor unit 13 can thus be protected from damage.

As also described above, the decelerating means is formed by the bushing 15 having the offset holes 61 offset from the center axis of the pressure inlet opening 33, and the communication wall communicating the pressure inlet opening 33 and offset holes 61 with each other, that is, by the wall formed by the bottom 62*a* of the notched groove 62 and the flange 51 of the fixing tube 14. As a result, the oil flowing into the offset holes 61 at a specific rate and impacting the flange 51 is slowed, and the pressure sensor unit 13 can be easily protected from damage by means of a simple construction.

In addition, because the metal filter 16 for reducing the flow rate of oil is disposed to the pressure inlet opening 33 of the pressure inlet tube 12, the oil slowed by the bushing 15 is further slowed by the metal mesh fibers. Accordingly, the pressure sensor unit 13 can be positively protected from damage.

Figure 6:
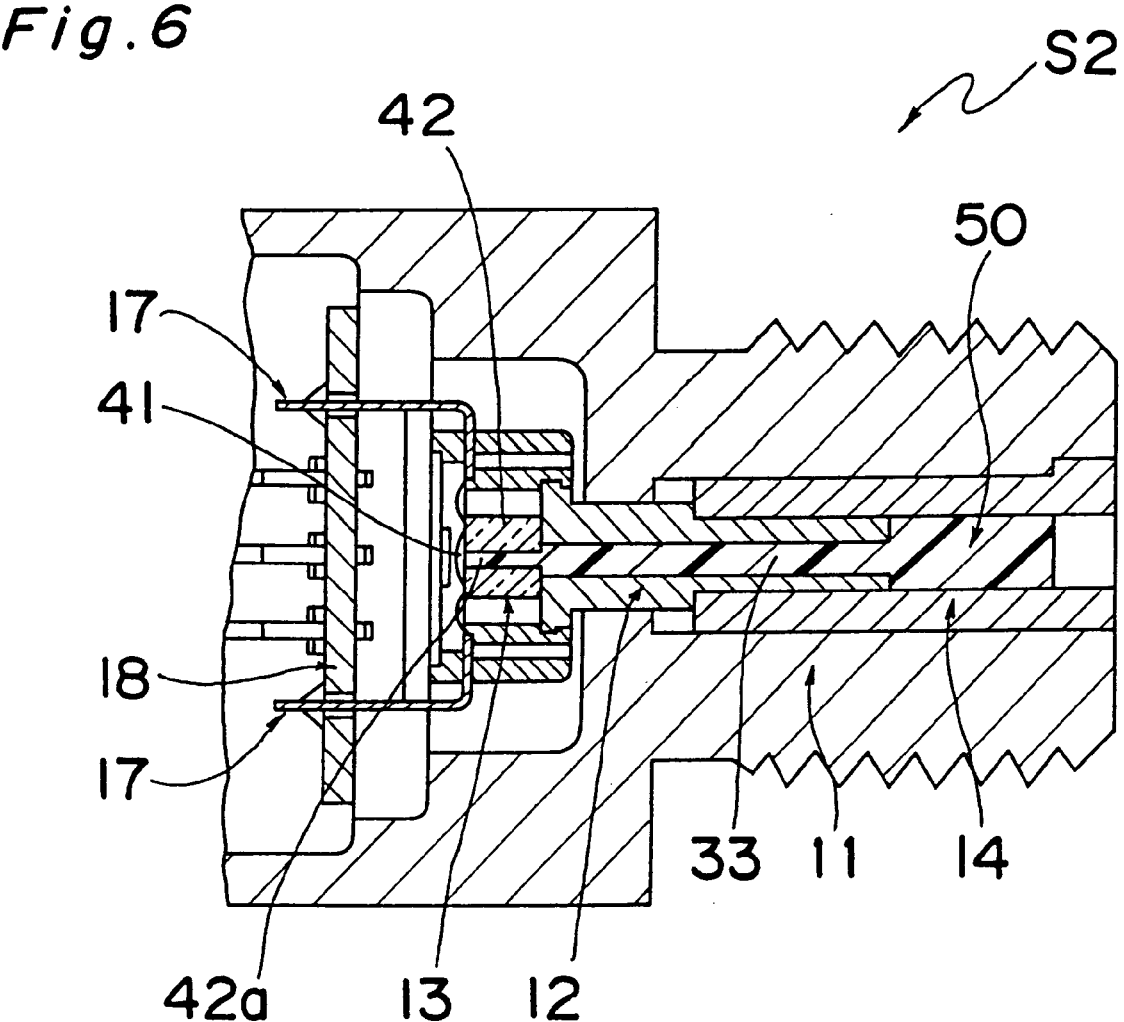
FIG. 6 is a fragmentary vertical sectional view of a pressure sensor according to a second embodiment of the present invention.

FIG. 6 depicts a pressure sensor S2 according to a second embodiment of the present invention. It should be noted that this second embodiment is described with reference to the function thereof that differs from that of the first embodiment. Members having effectively the same function in the first embodiment are identified by like reference numerals, and further description thereof is omitted below. Note that a bushing 15 and communication wall are not provided in this second embodiment.

A transmission gel 50 is an elastic, gelatinous body formed of a silicone gel containing silicone. It has excellent heat resistance with the elastic properties thereof varying little as a result of temperature. This transmission gel 50 is filled to the pressure inlet opening 33 and the axial hole 42*a* of the glass base 42, that is, to the pressure inlet path, and thus transmits oil pressure to the silicon diaphragm 41 of the pressure sensor unit 13.

The operation of the pressure sensor S2 thus comprised is described below. When a pressure surge occurs, oil flows to the fixing tube 14 with a specific flow rate maintained, and impacts the end of the transmission gel 50. Because the transmission gel 50 is filled to a pressure inlet path that progressively narrows toward the pressure sensor unit 13, the specific flow rate of the oil does not rise and the oil is not accelerated.

Because the transmission gel 50 is elastic, the oil pressure to be measured is transmitted through the transmission gel 50 to the silicon diaphragm 41, and is detected by the pressure sensor unit 13.

In the pressure sensor S2 according to the second embodiment of the present invention as described above, the elastic transmission gel 50 is filled to a pressure inlet path that becomes narrower toward the pressure sensor unit 13, and the pressure sensor unit 13 detects oil pressure transmitted thereto through the transmission gel 50. Unlike what happens in a conventional pressure sensor, the flow rate of the oil is therefore not increased as the oil approaches the pressure sensor unit 13, and the pressure sensor unit 13 can be protected from damage.

In addition, because the transmission gel 50 is formed of a silicone gel containing silicone, and the silicone gel has excellent heat resistance with little change in elastic properties due to temperature, it can be used throughout a wide temperature range.

It should be further noted that while the transmission gel 50 of the second embodiment is formed of a silicone gel, the invention shall not be so limited to the silicone gel and any gel with elasticity can be used.

Figure 7:
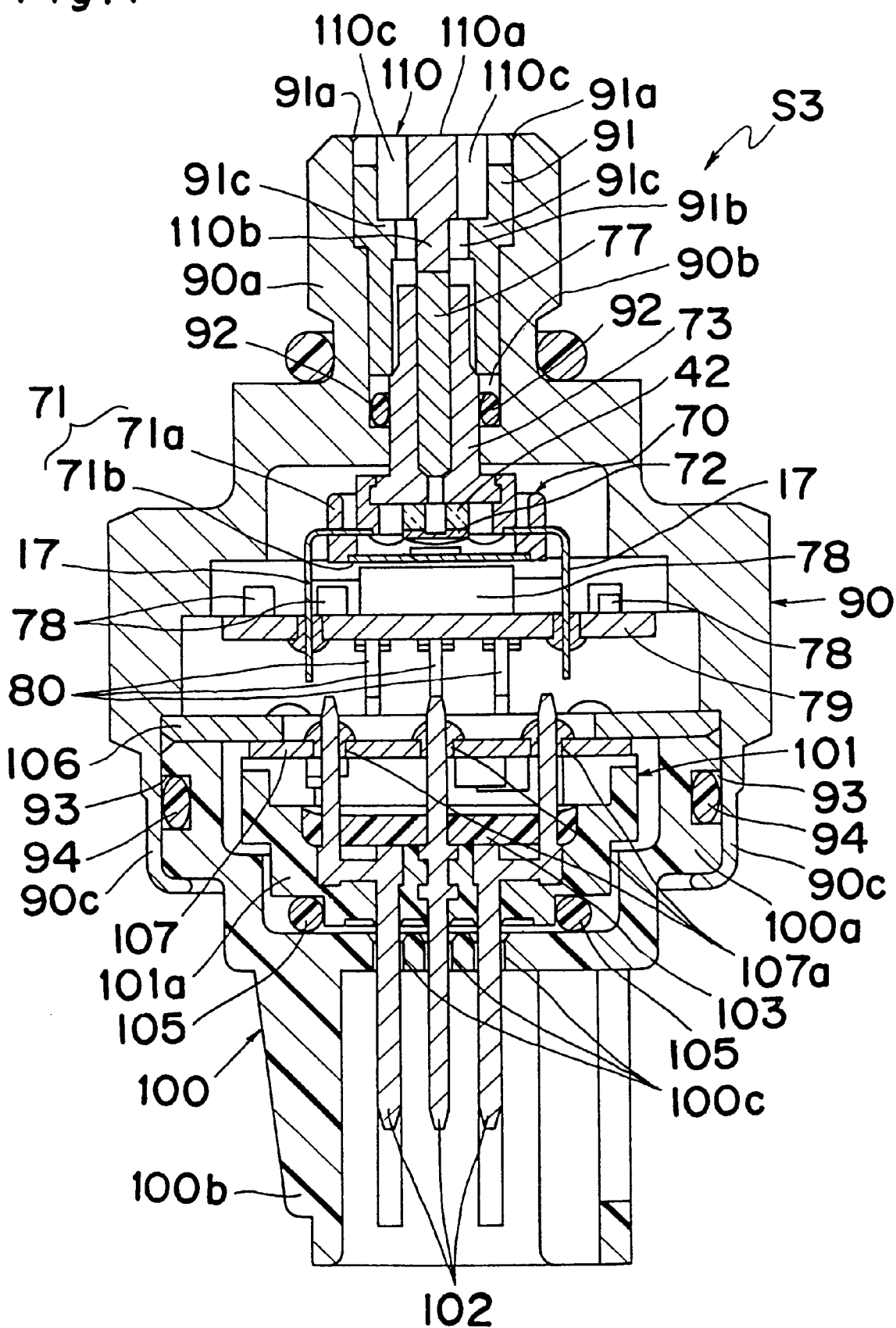
FIG. 7 is a vertical sectional view of a pressure sensor according to a third embodiment of the present invention.

FIG. 7 depicts a pressure sensor S3 according to a third embodiment of ;the present invention. As shown therein, the pressure sensor S3 includes a pressure sensor element 70, a case 90 in which the pressure sensor element 70 is housed, and a connector housing 100. The pressure sensor element 70 has a sensor unit 72 housed in a sensor housing 71 for converting the pressure of a fluid medium to be detected to an electrical signal, and a pressure inlet tube 73 housed in the case 90 and disposed in the proximity of the sensor housing 71 for introducing the fluid medium. The sensor housing 71 includes a generally box-shaped body 71a and a cover 71b. The connector housing 100 houses a terminal block (described below), and is fit to the back end of the case 90.

A metal filter 77 is inserted to and accommodated within the pressure inlet tube 73 where the filter 77 functions as a surge pressure buffering means for buffering instantaneous pressure surges occurring in the oil or other fluid of which the pressure is detected (referred to below as simply "fluid").

Figure 8:
FIG. 8 is a perspective view of a filter mounted in the pressure sensor of FIG. 7.

The filter 77 is formed by sintering a stainless steel, copper, or other metallic particles into a substantially rod-shaped body as shown in FIG. 8, and is inserted to the pressure inlet tube 73 of the pressure sensor element 70. More specifically, the filter 77 is porous so that the fluid can pass through the filter 77 to the sensor unit 72 of the pressure sensor element 70, but when a high momentary pressure surge occurs, fluid particles impact the inside walls while passing through the filter 77. The filter 77 thus creates resistance slowing the fluid particles, thereby buffering the pressure surge passing the filter 77 to the sensor unit 72, and capably preventing destruction of the sensor unit 72 resulting from a pressure surge.

Figure 9:
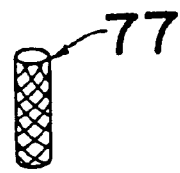
FIG. 9 is a view similar to FIG. 8, but depicting another filter.
Figure 10:
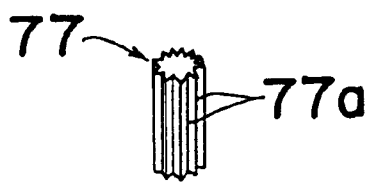
FIG. 10 is a view similar to FIG. 8, but depicting yet another filter.
Figure 11:
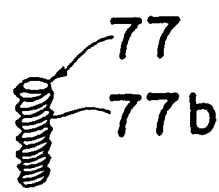
FIG. 11 is a view similar to FIG. 8, but depicting even yet another filter.

The structure of the filter 77 shall not, however, be limited to that described above, and can be varied in many ways. For example, the filter 77 can be a metallic rod-like member having a plurality of small surface markings formed by knurling the surface of the rod around the entire circumference thereof as shown in FIG. 9. The metallic rod-like member may have a plurality of longitudinal grooves 77a formed in the axial direction of the rod on the circumferential surface thereof as shown in FIG. 10. Alternatively, the metallic rod-like member may have a threaded ridge 77b formed circumferentially to the surface of the rod as shown in FIG. 11. With the filter 77 of these types, there is a gap between the inside wall of the pressure inlet tube 73 and the knurled pattern (surface roughness), longitudinal grooves 77a, or threaded ridge 77b formed on the rod surface. When the fluid passes through this gap, it impacts the knurl or other surface pattern of the filter 77, which produces resistance and buffers the pressure surge.

Figure 12:
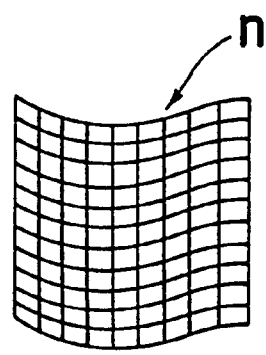
FIG. 12 is a perspective view of a metal mesh used to form yet another filter.
Figure 13:
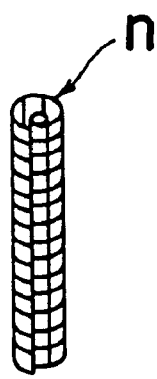
FIG. 13 is a perspective view of the metal mesh when rolled.
Figure 14:
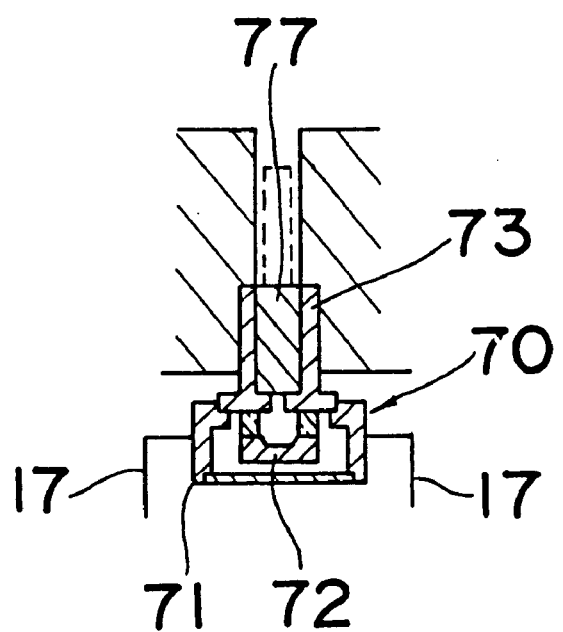
FIG. 14 is a vertical sectional view of the metal mesh of FIG. 13 when inserted to a pressure inlet tube mounted in the pressure sensor.

The filter 77 can also be formed by rolling metal mesh n as shown in FIG. 12 into a rod shape as shown in FIG. 13, and then compressing and inserting this rod to the pressure inlet tube 73 as shown in FIG. 14. When the fluid passes through this filter 77, it impacts the metal mesh n, which produces resistance and buffers the pressure surge. With this type of metal mesh n filter 77, the mesh size is finer and fluid particles can be more effectively slowed. It is also possible to adjust surge pressure buffering by controlling compression of the filter 77.

The pressure sensor element 70 comprised as described above is mounted to a ceramic circuit board 79 together with a signal amplification IC and other electronic parts 78, and is housed inside the case 90. A mounting thread 91 for holding the pressure inlet tube 73 of the pressure sensor element 70 and fixing the pressure sensor element 70 to the case 90 is fit to a narrow end 90a of the case 90. The outside circumference 91a of the mounting thread 91 is affixed to the end 90a of the case 90 by laser welding. A through-hole 91b is formed in the mounting thread 91 in the axial direction thereof, and fluid is conducted through the through-hole 91b from an external supply into the pressure inlet tube 73. That is, the mounting thread 91 constitutes a communication tube into which the pressure inlet tube 73 is inserted.

The pressure inlet tube 73 is inserted to an insertion opening 90b in the end 90a from the inside of the case 90. The gap between the perimeter of the insertion opening 90b and the base of the pressure inlet tube 73 is sealed by an O-ring 92 inserted therebetween. A perimeter wall 90c projects at the back end of the case 90, and the connector housing 100 is fit inside this perimeter wall 90c. A terminal block 101 is housed inside the connector housing 100.

The connector housing 100 includes a substantially cylindrical base 100a with a bottom, and a connector unit 100b projecting from the back end of the base 100a. The terminal block 101 is housed inside the base 100a.

The terminal block 101 is of a sealed structure in which three connector pins 102 are inserted to a mounting block 101a, which is molded from a synthetic resin, and the mounting block 101a and connector pins 102 are then fastened and sealed in place with an adhesive 103. The connector pins 102 protruding from the mounting block 101a of the terminal block 101 are passed through a through-hole 100c in the bottom of the connector unit 100b, and project to the inside of the connector unit 100b. A rubber seal 105 is fit around the mounting block 101a at the bottom of the base 100a to improve the seal between the connector unit 100b and the terminal block 101.

A shield plate 106 is disposed at the open end of the base 100a. The bases of the connector pins 102 projecting from the mounting block 101a toward the shield plate 106 are passed through a through-holes 107a in a glass epoxy printed circuit board 107 and soldered.

A plurality of connector pins 80 project from the side opposite the mounting surface of the circuit board 79 housed in the case 90, pass through the shield plate 106, and are electrically connected to the connector pins 102 via the circuit board 107.

The base 100a of the connector housing 100 is fit inside the perimeter wall 90c at the back of the case 90, and the connector housing 100 is fit and attached to the case 90 by caulking the end perimeter of the perimeter wall 90c. A groove 93 is formed around substantially the entire circumference in the outside surface of the base 100a where there is contact with the perimeter wall 90c of the case 90. An O-ring 94 is fit in this groove 93 to create a seal. The gap between the case 90 and connector housing 100 is thus sealed by the O-ring 94 in the groove 93.

Figure 15A:
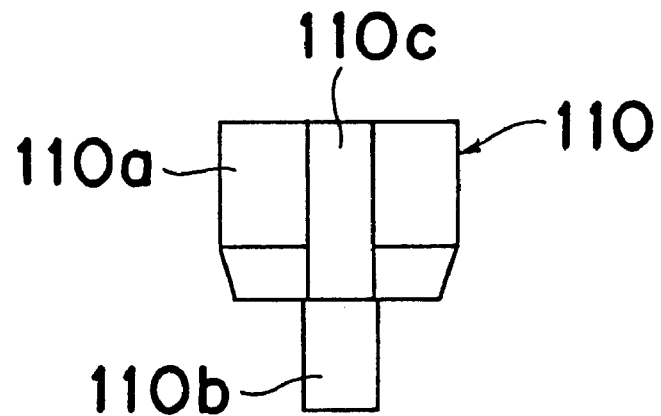
FIG. 15A is a side view of a bushing mounted in the pressure sensor of FIG. 7.
Figure 15B:
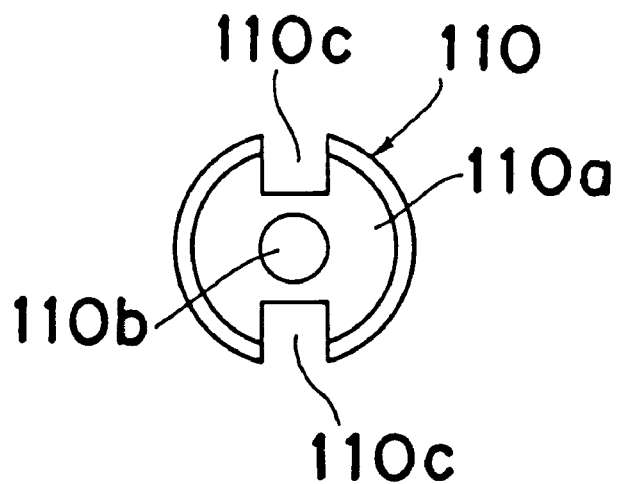
FIG. 15B is a bottom plan view of the bushing of FIG. 15A.

A bushing 110 made of metal (for example, SS41) is fit to the throughhole 91a of the mounting thread 91 (communication tube) secured to the end 90a of the case 90 from the open end side of the mounting thread 91. As shown in FIGS. 15A and 15B, this bushing 110 has a generally columnar main part 110a, a contact part 110b, and a pair of offset holes 110c. The contact part 110b projects from one end of the main part 110a with a smaller diameter than the main part 110a. The offset holes 110c are offset toward the outside of the main part 110a from the center axis of the pressure inlet tube 73.

When the bushing 110 is fit to the through-hole 91b of the mounting thread 91 from the open end side thereof, the end of the contact part 110b contacts the filter 77. The bushing 110 thus works to prevent the removal of the filter 77 from the pressure inlet tube 73. The filter 77 is thereby fixed in place, and a stable surge pressure buffering effect can be achieved.

The path through which the fluid passes from the open end of the insertion opening 90b, through the offset holes 110c in the bushing 110 and the through-hole 91b in the mounting thread 91 to the sensor unit 72 of the pressure sensor element 70 is also bent because the mounting thread 91 is inserted to the inside of the insertion opening 90b, and the end of the open end side of the mounting thread 91 to which the bushing 110 is fit is slightly wide. More specifically, fluid particles introduced through the offset holes 110c of the bushing 110 impact the open end of the mounting thread 91 and the shoulder 91c of the inside wall, and are thereby slowed. As a result, pressure surges can also be buffered by the flow path.

Figure 16:
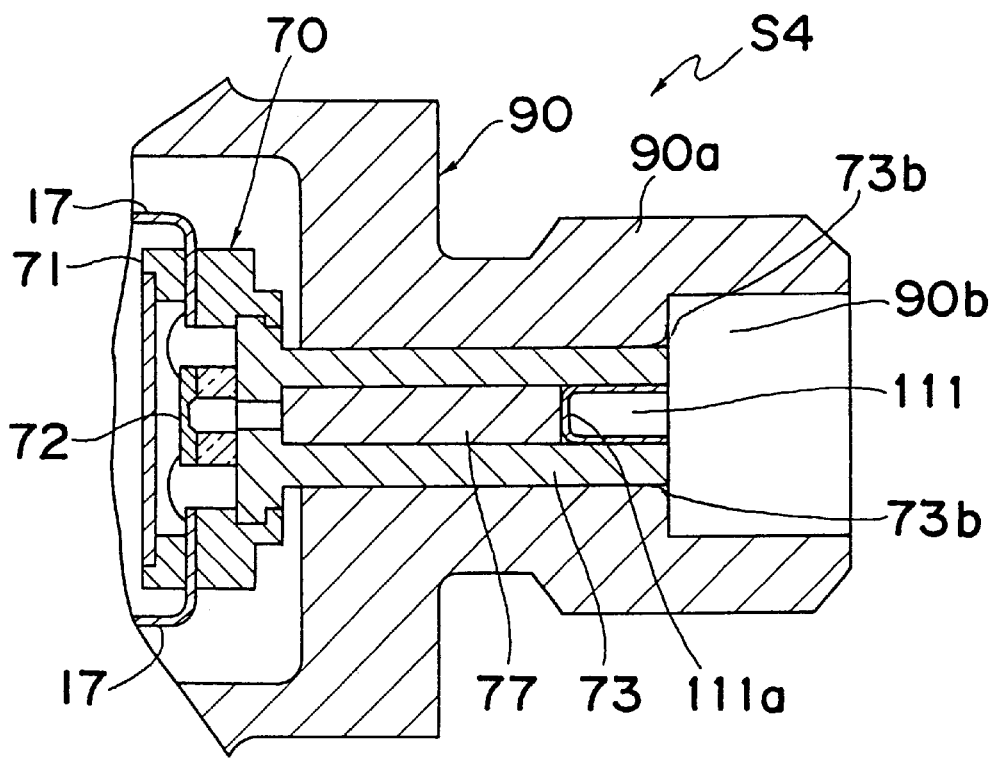
FIG. 16 is a fragmentary vertical sectional view of a pressure sensor according to a fourth embodiment of the present invention.

FIG. 16 depicts a pressure sensor S4 according to a fourth embodiment of the present invention.

Figure 17:
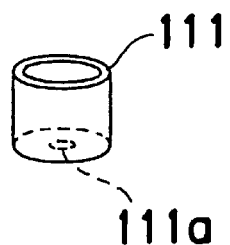
FIG. 17 is a perspective view of a securing member mounted in the pressure sensor of FIG. 16.
Figure 18:
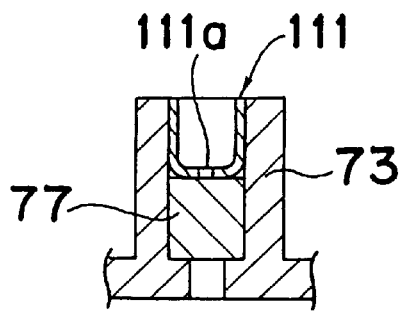
FIG. 18 is a vertical sectional view of the securing member of FIG. 17 when inserted to a pressure inlet tube mounted in the pressure sensor of FIG. 16.

In the third embodiment above, the removal of the filter 77 inserted to the pressure inlet tube 73 of the pressure sensor element 70 is prevented by means of the bushing 110 fit to the mounting thread 91. In this embodiment, however, a securing member 111 having a cylindrical shape with a bottom in which there is a through-hole 111 a for fluid passage as shown in FIG. 17 is pressed into the pressure inlet tube 73 to prevent the filter 77 from coming out. The securing member 111 is pressed into place with the bottom thereof to the inside as shown in FIG. 18 to prevent the filter 77 from slipping out of the pressure inlet tube 73. Fluid passes through the through-hole 111 a in the bottom of the securing member 111.

It should be noted, however, that the securing member shall not be limited to the above-described configuration, and various constructions are possible.

Figure 19:
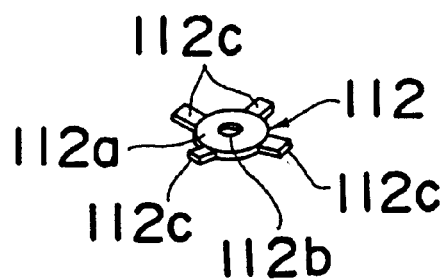
FIG. 19 is a perspective view of another securing member.
Figure 20:
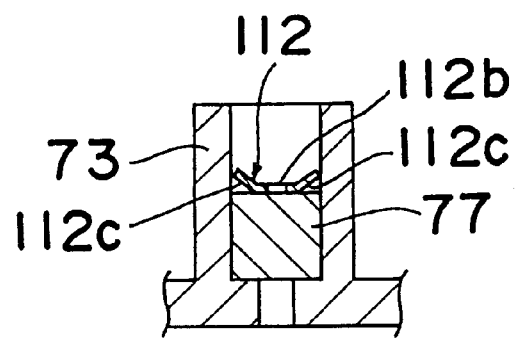
FIG. 20 is a vertical sectional view of the securing member of FIG. 19 when inserted to the pressure inlet tube.
Figure 21:
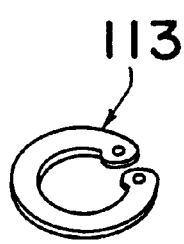
FIG. 21 is a perspective view of yet another securing member.
Figure 22:
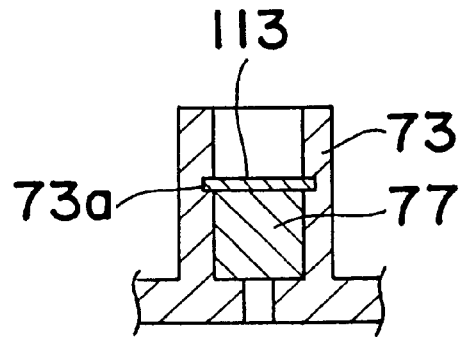
FIG. 22 is a vertical sectional view of the securing member of FIG. 21 when inserted to the pressure inlet tube.

For example, FIGS. 19 and 20 depict another securing member 112 having a circular plate 112a and a plurality of rectangular tabs 112c integrally formed therewith so as project radially outwardly therefrom. The circular plate 112a has a hole 112b defined therein at the center thereof for fluid passage. FIGS. 21 and 22 depict a further securing member 113 that is a so-called C-ring inserted to and engaging a groove 73a formed in the inside wall of the pressure inlet tube 73 at a position to the outside of the end of the filter 77. The filter 77 can thus be fixed positively inside the pressure inlet tube 73 by means of any securing member 111 to 113.

It will also be noted that while the mounting thread 91 screwed into the pressure inlet tube 73 is laser welded to the end 90a of the case 90 to hold and secure the pressure inlet tube 73 in the case 90 in the first embodiment, and an O-ring 92 is provided to seal the fluid in the case 90, this configuration is complicated to assemble and is not well-suited to mass production. Note, further, that providing a male thread to the circumference of the pressure inlet tube 73, or a female thread to the circumference of the mounting thread 91, has a minimal effect improving assembly and mass production characteristics.

According to the fourth embodiment of the present invention, the pressure inlet tube 73 is directly inserted to the insertion opening 90b formed in the end 90a of the case 90 as shown in FIG. 16, and the end perimeter 73b of the pressure inlet tube 73 is welded to the case 90 around substantially the entire circumference thereof at the perimeter of the insertion opening 90b by, for example, laser welding. Because the pressure inlet tube 73 and case 90 are thus directly and airtightly fixed to each other, a separate seal member (e.g., an O-ring) is not required, thus simplifying the structure and assemblage and enhancing the mass producibility.

Figure 23:
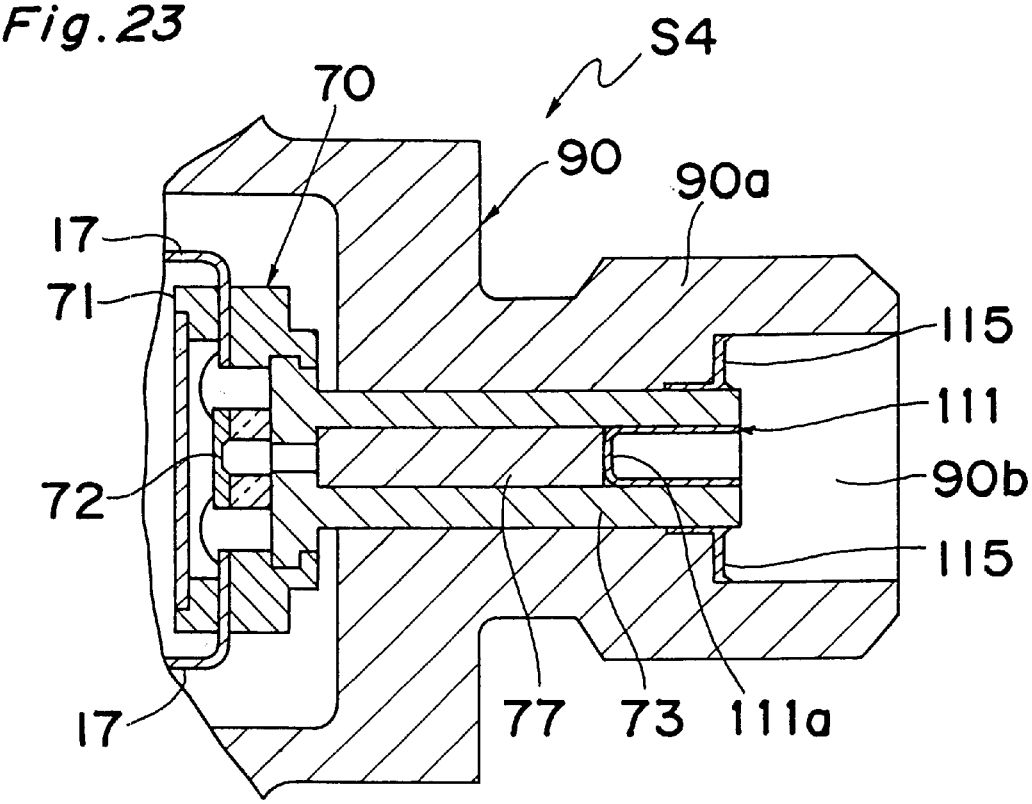
FIG. 23 is a view similar to FIG. 16, but depicting a modification thereof.

The pressure inlet tube 73 and case 90 can also be directly and airtightly fastened by other means, including particularly by imparting a coating (such as a gold plating to the pressure inlet tube 73 and a solder coating to the end 90a of the case 90) with good solderability to the pressure inlet tube 73 and end 90a of the case 90 as shown in FIG. 23. Substantially the entire circumference of the end of the pressure inlet tube 73 is then exposed to an optical beam or laser to melt the coating and thus solder and fix the pressure inlet tube 73 to the case 90 (at the areas marked as 115 in FIG. 23).

Figure 24:
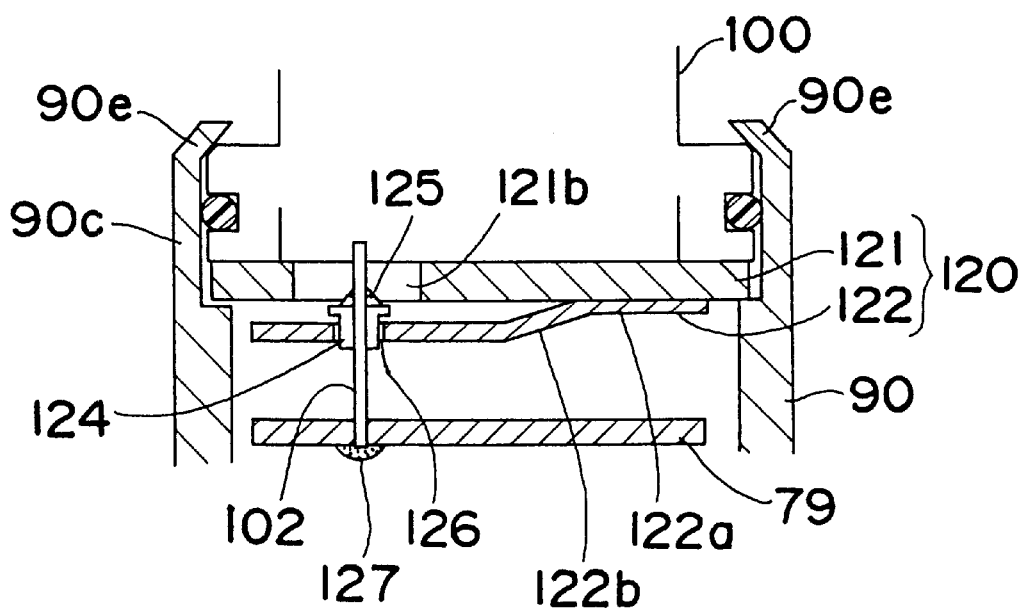
FIG. 24 is a fragmentary vertical sectional view of a pressure sensor employing a shield plate block and through type capacitors.
Figure 25:
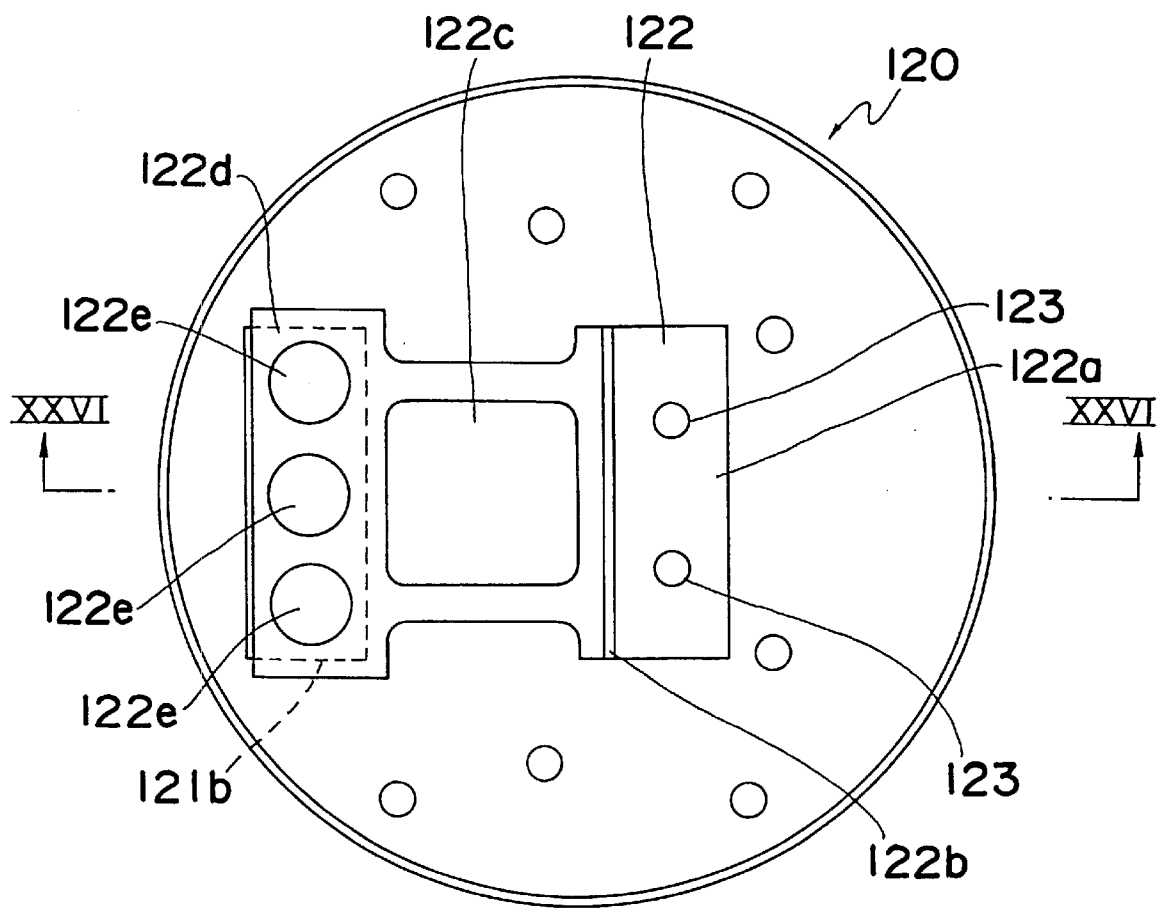
FIG. 25 is a top plan view of the shield plate block shown in FIG. 24.
Figure 26:
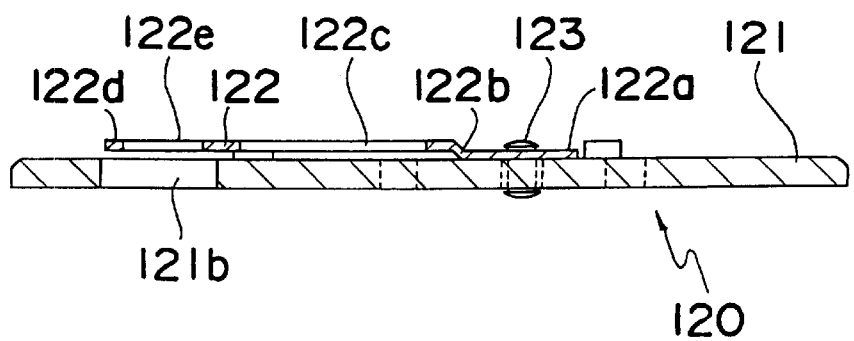
FIG. 26 is a sectional view taken along line XXVI—XXVI in FIG. 25.

It is to be noted here that the shield plate 106 employed in the above-described embodiments may be replaced with a shield plate block 120 as shown in FIGS. 24 to 26.

More specifically, the shield plate block 120 includes a stationary shield plate 121 and an elastic shield plate 122 made of a metallic plate spring. The elastic shield plate 122 is secured at a proximal end thereof 122a to the stationary shield plate 121 by means of a plurality of metal pins 123. The elastic shield plate 122 has a mounting portion 122d having a plurality of holes 122e defined therein in each of which a through type capacitor 124 is received. The through type capacitors 124 are soldered to the elastic shield plate 122 at 125 and 126. Each of the connector pins 102 is soldered to the printed circuit board 79 at 127 and extends through the elastic shield plate 122 via one of the through type capacitors 124. The stationary shield plate 121 has a rectangular hole 121b defined therein through which the connector pins 102 extend. The elastic shield plate 122 also has a rectangular hole 122c defined therein at an intermediate portion lying between the proximal end 122a and the mounting portion 122d to enhance the elasticity thereof.

Because the through type capacitors 124 are soldered to the elastic shield plate 122, a force applied to the connector pins 102 is buffered by the elastic force of the elastic shield plate 122 when an end portion 90e of the perimeter wall 90c of the case 90 is caulked. Accordingly, it is possible to prevent separation of the connector pins 102 from the printed circuit board 79 at the soldered portion 127 or cracking of the printed circuit board 79, enhancing the yield during the manufacture of the pressure sensors and the reliability thereof.

Figure 27:
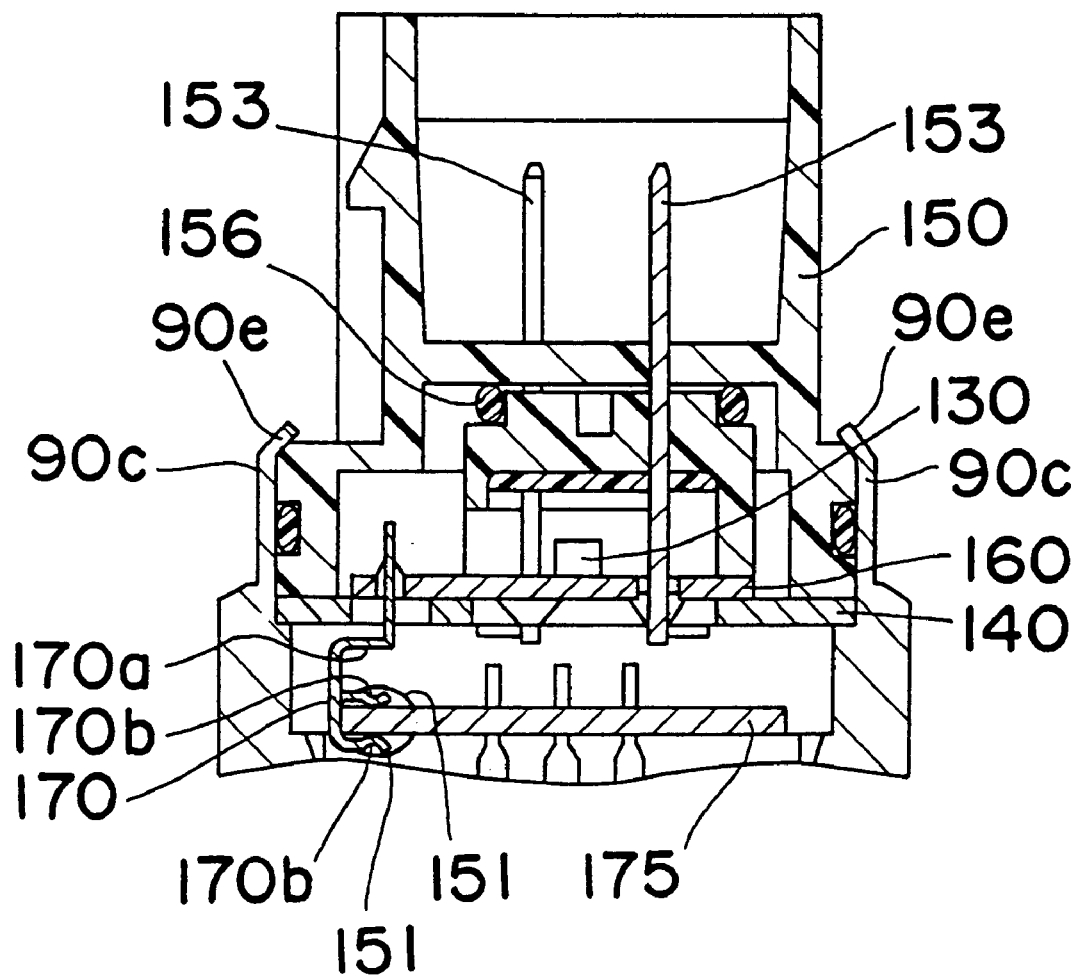
FIG. 27 is a fragmentary vertical sectional view of a pressure sensor employing chip capacitors.
Figure 28:
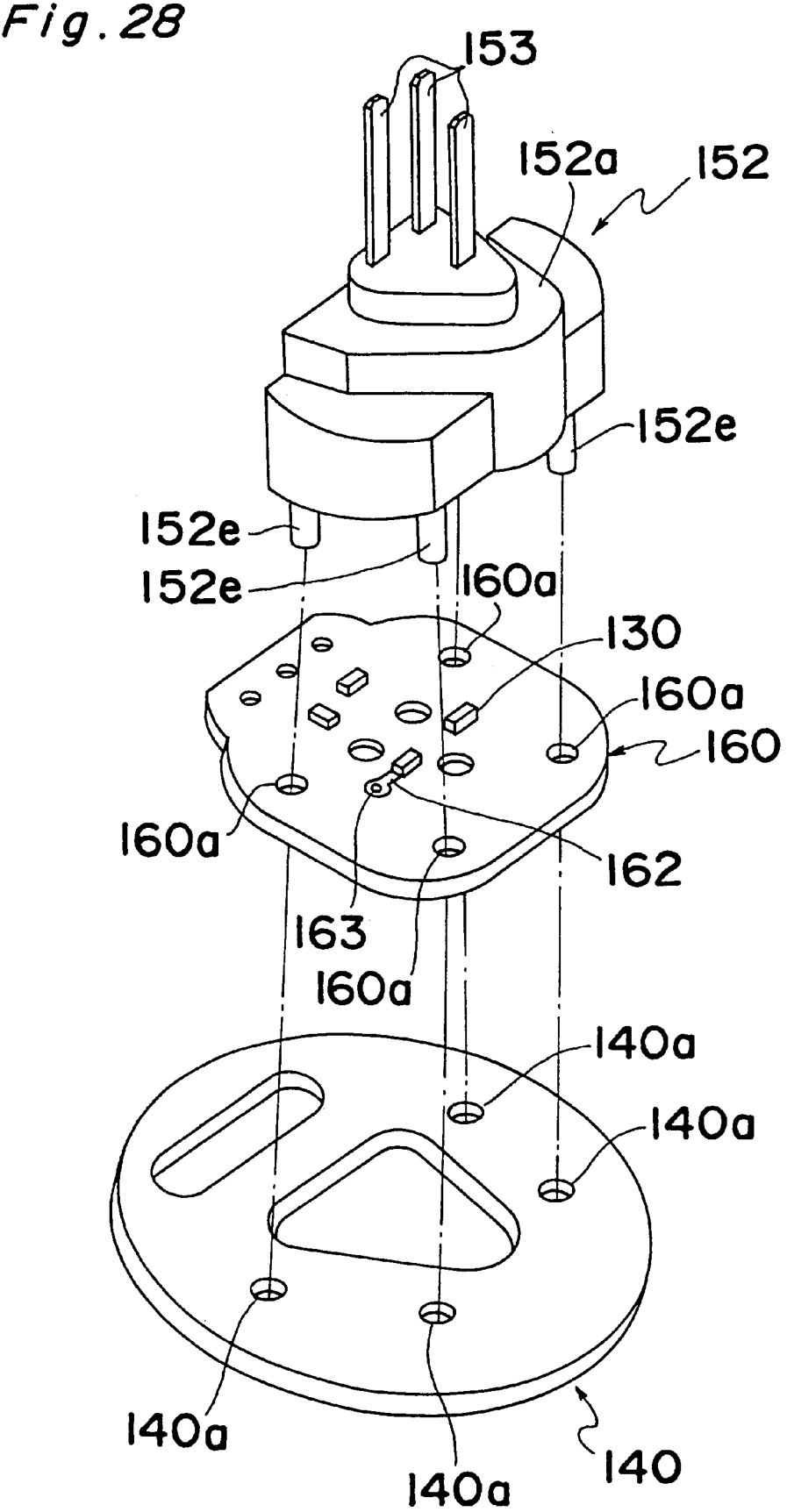
FIG. 28 is an exploded perspective view of the pressure sensor of FIG. 27.

It is also to be noted that chip capacitors can be used in place of the through type capacitors 124, as shown in FIGS. 27 and 28.

More specifically, chip capacitors 130 are mounted on a glass epoxy substrate 160, which is in turn sandwiched between a shield plate 140 made of a metal (for example, SPCC) and a terminal block 152. The terminal block 152 has a fixed portion 152a (nylon 66 and glass: 15%) and a plurality of bosses 152e extending outwardly therefrom. These bosses 152e are respectively inserted into holes 160a defined in the glass epoxy substrate 160 and then into holes 140a defined in the shield plate 140. The terminal block 152, glass epoxy substrate 160 and shield plate 140 are subsequently integrated by heat-caulking ends of the bosses 152e. The glass epoxy substrate 160 has a first conductor pattern (not shown) formed on one side thereof confronting the shield plate 140 and made bare widely so that the first conductor pattern may be held in contact with the shield plate 140. The glass epoxy substrate 160 also has a second conductor pattern 162 formed on the other side thereof. One end of each chip capacitor 130 is connected to the second conductor pattern 162 and then to the first conductor patter through a through-hole 163 defined in the glass epoxy substrate 160. Connector pins 153 are electrically connected to the glass epoxy substrate 160 by soldering and extend through an internal wall of a connector housing 150. A rubber seal 156 is interposed between the internal wall of the connector housing 150 and the fixed portion 152a of the terminal block 152.

In the embodiment shown in FIGS. 27 and 28, connector terminals 170 each made of a clip terminal for HIC use are employed in place of the connector pins 102. Each connector terminal 170 has one end inserted and soldered to the glass epoxy substrate 160, and the other end having a pair of clip portions 170b between which a printed circuit board (ceramic substrate) 140 is sandwiched and to which the printed circuit board 140 is soldered. This structure enhances the reliability at the soldered portions and facilitates the automating of insertion and soldering of the connector terminals 170, making it possible to reduce the manufacturing cost.

Furthermore, each connector terminal 170 has a bent portion 170a formed at an intermediate portion thereof. The bent portion 170a acts to buffer a force applied to soldered portions 151 between the connector terminal 170 and the printed circuit board 175 when an end portion 90e of a perimeter wall 90c of the case 90 is caulked. Accordingly, it is possible to prevent separation of the connector terminals 170 from the printed circuit board 175 at the soldered portions 151 or cracking of the printed circuit board 175, enhancing the yield during the manufacture of the pressure sensors and the reliability thereof.

As is clear from the above, according to the present invention, a decelerating means for reducing the flow rate of oil is disposed to a distal end side of the pressure inlet tube. As a result, an increased flow rate of oil resulting from, for example, a pressure surge is damped by the decelerating means at the distal end of the pressure inlet tube, the oil does not impact the pressure sensor unit at high speed, and the pressure unit can thus be protected from damage.

The decelerating means is formed by a bushing having an offset hole offset from the center axis of a pressure inlet opening, and a communication wall communicating the pressure inlet opening and the offset hole with each other. Oil thus flows into the offset hole with a specific flow rate maintained and collides with the communication wall. This specific flow rate is thus reduced, making it possible to easily protect the pressure sensor unit from damage by means of a simple construction.

Because a metal filter for reducing the flow rate of oil is disposed in the pressure inlet opening of the pressure inlet tube, oil slowed by the decelerating means is thus further slowed by the metal mesh fibers, thus positively protecting the pressure sensor unit from damage.

In another form of the present invention, an elastic transmission gel is filled to a pressure inlet path that narrows progressively toward the pressure sensor unit, and the pressure sensor unit detects oil pressure transmitted through the transmission gel. Therefore, unlike a conventional pressure sensor in which the oil speed becomes faster toward the pressure sensor unit, the oil is not accelerated and the pressure sensor unit can be protected from damage.

Because the transmission gel is a silicone gel containing silicone and having excellent heat resistance with little change in elastic properties due to temperature, the pressure sensor can therefore also be used throughout a wide temperature range.

In a further form of the present invention, an instantaneous high pressure buffering means for buffering an instantaneous high pressure applied by the fluid medium to the sensor unit is disposed inside the pressure inlet tube. It is therefore possible by means of this instantaneous high pressure buffering means to prevent destruction of the sensor unit as a result of, for example, a pressure surge in the fluid medium to be detected.

The instantaneous high pressure buffering means includes a filter disposed inside the pressure inlet tube. The filter is formed of sintered metallic particles or by knurling the surface of a metal rod. Alternatively, the filter is formed of a metal rod with a plurality of longitudinal grooves or a screw thread formed on the surface thereof. A pressure surge applied to the sensor unit can thus be buffered and destruction of the sensor unit prevented because particles of the fluid medium collide with the filter when the pressure surge occurs. At this moment, the filter provides resistance, and the fluid particles are slowed by the resistance created by the filter.

The filter can be formed by rolling and compressing a metal mesh into a rod shape. In this case, fluid particles can also be slowed more effectively because the filter mesh is finer, and surge pressure buffering can be adjusted by controlling compression of the metal mesh.

The pressure sensor may include a communication tube to one end of which is inserted the pressure inlet tube, and a bushing having an offset hole offset from the center axis of the pressure inlet tube. The bushing is fit to the other end of the communication tube with at least one end thereof held in contact with the filter.

By this construction, removal of the filter from the pressure inlet tube can be prevented and, hence, the filter can be secured by the bushing, thus achieving a stable surge pressure buffering effect. In addition, because the fluid path from the offset hole in the bushing to the pressure inlet tube inserted to the communication tube bends, fluid particles collide with the walls of the fluid path and are slowed, thus further buffering pressure surges.

Also, a securing member is press fit into the pressure inlet tube for preventing removal of the filter. The securing member is of a tubular shape with a bottom in which a hole is provided for passing the fluid medium, or has a flat body and a plurality of rectangular tabs integrally formed therewith so as to project radially outwardly therefrom. The securing member may have substantially a C-ring shape to be inserted to and engaged with an engaging groove formed in the inside wall of the pressure inlet tube. As a result, the filter can be positively secured inside the pressure inlet tube.

Moreover, a case of the pressure sensor has an insertion hole defined therein to which the pressure inlet tube is inserted, and the pressure inlet tube is welded or soldered around substantially the entire circumference of the tube end to the case at the opening to the insertion hole. By so doing, because the pressure inlet tube and case are directly and airtightly fastened together, a separate seal member is not required. As a result, not only can the structure of the pressure sensor be simplified, but also assemblage thereof is facilitated.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A pressure sensor comprising:
   a body;
   a pressure inlet tube housed in said body and having a pressure inlet opening defined therein for introducing oil having an oil pressure, said pressure inlet tube having a proximal end and a distal end opposite to each other;

a pressure sensor unit affixed to a surface of said proximal end of said pressure inlet tube and covering said pressure inlet opening to convert the oil pressure to an electrical signal; and a decelerating device positioned at a distal end side of said pressure inlet tube and comprising a communication wall and a bushing, said communication wall having a stepped cross-section said decelerating device reducing a flow rate of the oil.

2. The pressure sensor according to claim 1, wherein said bushing has a hole offset from a center axis of said pressure inlet opening, and said communication wall connects said pressure inlet opening and said hole with each other.

3. The pressure sensor according to claim 2, further comprising a metal filter received in said pressure inlet opening to reduce the flow rate of the oil.

4. A pressure sensor comprising:

a body;

a pressure inlet tube accommodated in said body and having a pressure inlet opening defined therein for introducing an oil pressure of a fluid medium;

a pressure sensor unit affixed to a proximal end surface of said pressure inlet tube and covering said pressure inlet opening to convert the oil pressure to an electrical signal; and an elastic transmission gel accommodated in said pressure inlet opening and in contact with the fluid medium at only one end of said pressure inlet opening for transmitting oil pressure to said pressure sensor unit;

wherein a pressure inlet path defined in said pressure inlet opening narrows progressively toward said pressure sensor unit, and said pressure sensor unit detects the oil pressure through said transmission gel in said pressure inlet path.

5. The pressure sensor according to claim 4, wherein said transmission gel is a silicone gel containing silicone.

6. A pressure sensor comprising:

a case;

a sensor unit housed in said case for converting pressure of a fluid mediumn to an electrical signal;

a pressure inlet tube housed in said case for introducing the fluid medium; and an instantaneous high pressure buffering device disposed inside said pressure inlet tube and comprising a filter that allows the fluid medium to flow therethrough, said device buffering an instantaneous high pressure applied by the fluid medium to said sensor unit, wherein said pressure inlet path narrows progressively through a stepped cross section towards said pressure unit.

7. The pressure sensor according to claim 6, wherein said filter is formed of sintered metallic particles and is disposed inside said pressure inlet tube.

8. The pressure sensor according to claim 6, wherein said filter is disposed inside said pressure inlet tube and comprises a metal rod having a knurled surface.

9. The pressure sensor according to claim 6, wherein said filter is disposed inside said pressure inlet tube, said filter comprising a metal rod with a plurality of longitudinal grooves on a surface of said rod.

10. The pressure sensor according to claim 6, wherein said filter is disposed inside said pressure inlet tube, said filter comprising a metal rod with a screw thread on a surface of said rod.

11. The pressure sensor according to claim 6, wherein said filter is disposed inside said pressure inlet tube, said filter is formed by rolling and compressing a metal mesh into a rod shape.

12. The pressure sensor according to claim 6, further comprising a communication tube having a first end, to which said pressure inlet tube is inserted, and a second end opposite to said first end, and a bushing having an offset hole offset from a center axis of said pressure inlet tube, said bushing being fit to said second end of said communication tube with at least one end thereof held in contact with said filter.

13. The pressure sensor according to claim 6, further comprising a securing member press fit into said pressure inlet tube for preventing removal of said filter, said securing member being of a tubular shape with a bottom in which a hole is provided for passing said fluid medium.

14. The pressure sensor according to claim 6, further comprising a securing member press fit into said pressure inlet tube for preventing removal of said filter, said securing member having a flat body and a plurality of tabs integrally formed therewith so as project radially outwardly therefrom.

15. The pressure sensor according to claim 6, further comprising a securing member having substantially a C-ring shape and being inserted to and engaged with an engaging groove for preventing removal of said filter, said engaging groove being formed in an inside wall of said pressure inlet tube.

16. The pressure sensor according to claim 6, wherein said case has an insertion hole defined therein to which said pressure inlet tube is inserted, and said pressure inlet tube is welded around substantially an entire circumference of one end thereof to said case at an opening to said insertion hole.

17. The pressure sensor according to claim 6, wherein said case has an insertion hole defined therein to which said pressure inlet tube is inserted, and said pressure inlet tube is soldered around substantially an entire circumference of one end thereof to said case at an opening to said insertion hole.

18. The pressure sensor according to claim 1, said pressure inlet opening being in constant fluid communication with a chamber being measured.

19. The pressure sensor according to claim 4, said pressure inlet opening being constant in fluid communication with a chamber being measured.

20. The pressure sensor according to claim 6, said pressure inlet tube having an opening that is in constant fluid communication with a chamber being measured.

* * * * *

UNITED STATES PATENT AND TRADEMARK OFFICE
CERTIFICATE OF CORRECTION

PATENT NO.   : 6,070,469
DATED        : June 6, 2000
INVENTOR(S)  : N. TANIGUCHI et al.

It is certified that error appears in the above-identified patent and that said Letters Patent is hereby corrected as shown below:

At column 13, line 11 (claim 1, line 15) of the printed patent, after "cross-section" insert --- , ---.

Signed and Sealed this

Twenty-second Day of May, 2001

Attest:

NICHOLAS P. GODICI

Attesting Officer   Acting Director of the United States Patent and Trademark Office